Nov. 29, 1966 KARL-FRIEDRICH LUFT 3,287,959
PORTABLE MEASURING APPARATUS FOR DETERMINING THE OXYGEN CONTENT OF A GAS, IN PARTICULAR OF AN AIR MIXTURE IN A MINE WORKING
Filed July 1, 1963 2 Sheets-Sheet 1
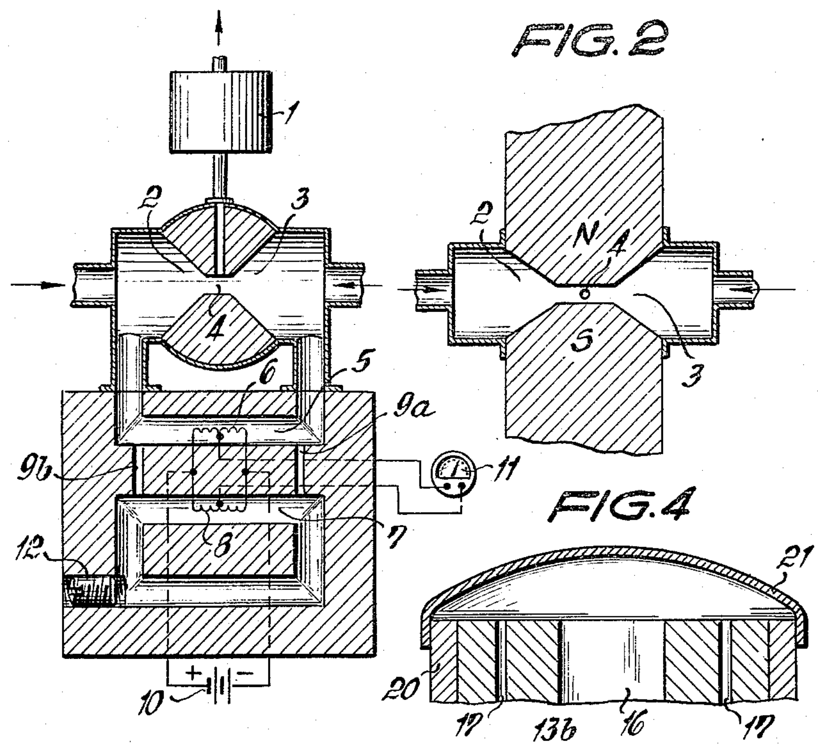
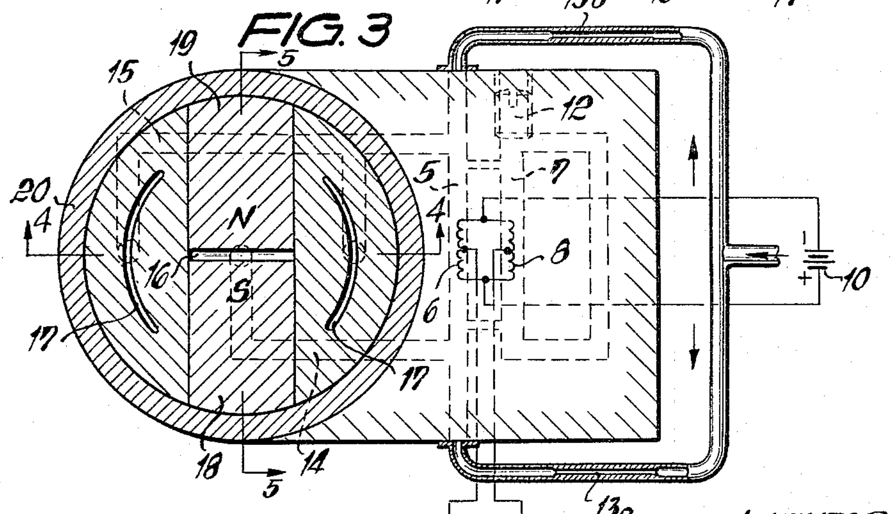
INVENTOR
Karl Friedrich Luft
by Malcolm W. Fraser
attorney INVENTOR.
KARL-FRIEDRICH LUFT
BY [signature]

United States Patent Office 3,287,959
Patented Nov. 29, 1966

3,287,959

PORTABLE MEASURING APPARATUS FOR DETERMINING THE OXYGEN CONTENT OF A GAS, IN PARTICULAR OF AN AIR MIXTURE IN A MINE WORKING

Karl-Friedrich Luft, 39 An St. Albertus Magnus, Essen, Germany

Filed July 1, 1963, Ser. No. 291,675
Claims priority, application Germany, July 5, 1962, B 67,927
7 Claims. (Cl. 73—23)

This invention relates to a portable measuring apparatus for determining the oxygen content of a gas and relates in particular to the determination of the oxygen content of air mixtures in mining.

Various devices are already used for measuring the oxygen content of gas mixtures, utilizing the paramagnetism of oxygen. As as rule these devices are based on the fact that, in the non-homogeneous field of a strong magnet, heating produces a change in susceptibility of a gas mixture to be analysed, the differential pressure produced thereby, or the flow occurring owing to the differential pressure, being measured. In these devices, probes introduced into the magnetic field serve both to heat the gas and to measure the thermo-magnetic flow effects.

Such devices have proved to be impracticable from the point of view of enabling measurement to be carried out easily and in any situation including, in particular, the confined space below ground. Nevertheless, mining practice demands that such devices should be available because the testing of the breathability of the air underground makes it necessary to determine the oxygen concentration. Known devices of the type mentioned above are extremely unwieldy and therefore not suitable for use in confined conditions. The reason for this undesirable characteristic resides in that the mounting of the probes in the magnetic field requires a large air gap, so that a comparatively large and heavy magnet is required for creating a sufficiently strong magnetic field. In addition, the heating power for the probes is so great, owing to the heat conduction at the armatures, which are located in the immediate vicinity of the probes, that it is either very difficult or even impossible for the necessary electrical energy to be supplied from a battery. Furthermore, known types of appartus are affected by inclination thereof because of the thermal convection occurring owing to the spatial arrangement of the probes in the magnetic field.

One method is already known, by means of which these difficulties can be at least partly avoided. Two gases are involved, namely the gas to be measured and a comparison gas. According to this known method, the comparison gas flows into the magnetic field and the pressure differential thus occurring is measured. Since in this case the arrangement required for measuring the pressure can be installed outside the magnetic field, it is possible to operate with a comparatively narrower air gap for the magnet.

In spite of the advantages obtained in this way, the known method has not succeeded in becoming generally accepted so far. This would appear to arise primarily from the difficulty of measuring the very small differential pressures with the means which are available in the case of an apparatus which can be easily transported, for which there has been no possibility of solution heretofore. A further obstacle to the use of the known method in practical operation is the inaccuracy of the results obtainable therewith, because in carrying the method into effect the procedure must be such that the comparison gas flows out of a duct opening at the center of the magnetic poles, into the gradually widening air gap of the magnet, so that the gas to be measured flows round this air gap. For this reason, there is formed in the region of the non-homogeneous magnetic field, in which it is known that a pressure effect can occur, a mixing zone whose position and concentration profile depend on the flow velocities of the two gases. The differential pressure which is decisive for the measurement is thereby rendered somewhat indefinite owing to the variability of the volume susceptibility.

The present invention starts from the known principle of determining the oxygen content of a gas mixture by measuring the difference in the oxygen content of two gases and it provides an apparatus with which the faults and drawbacks, mentioned hereinbefore as occurring in known types of apparatus and with known measuring methods, are avoided or, at least reduced. The invention makes it possible to provide an apparatus which, even when employed in confined mine spaces and under the severe conditions of mine damp, can be used by unskilled labor and which is less costly to manufacture than known apparatus and operates almost without attention or maintenance.

According to the invention there is provided portable measuring apparatus for determining the oxygen content of a gas, and in particular of an air mixture in a mine working, using the differential pressure which occurs between two gases of different oxygen contents in a mon-homogeneous magnetic field, the apparatus comprising a symmetrical bridge circuit located outside the magnetic field, for measuring the flow occuring due to the magnetic force, and including two like thermal flow-measuring means, one of the flow-measuring means being disposed in a main gas flow system and the other in a secondary gas flow system which is arranged in parallel with the main gas flow system and the flow resistance of which is so adjusted as to compensate for the influence of lift and acceleration effects.

According to a preferred constructional form of the invention, the simple conditions required for bringing about the differential pressure producing the flow to be measured are established by drawing the gas to be measured and the comparison or reference gas through a duct located in the center of the homogeneous field, the flow-measuring means being arranged in parallel with the inlet points for the two gases, which are disposed outside the field.

As the intermixing zone of the two gases is located in the homogeneous magnetic field and the gases are now completely separated from one another in the non-homogeneous field, the differential pressure is determined almost entirely by the difference in the oxygen content of the two gases, since the slight transverse flow through the flow-measuring means can be either completely disregarded or prevented.

According to another constructional form of the invention, which is intended especially for measuring the difference between the oxygen content of a comparison gas and of atmospheric air, the arrangement is preferably such that the comparison gas is split into two partial streams, one of which passes to the exterior by way of the air gap of the magnet while the other passes to the exterior by way of an annular or arcuate gap located symmetrically around the air gap in the substantially field-free space.

That part of the magnet poles which faces the external space is given such a form and design that the transition from the homogeneous maximum field to the region of small field strength takes place as quickly as possible.

Practically speaking, this can be achieved most simply in that the outer pole surfaces lie in one plane with the surface defining the outer space, so that the narrowest part of the air gap opens into the outer space without any specially constrcited transitional zone.

It is particularly advantageous that means should be provided to adjust the flow of the comparison gas down to a minimum value which is just sufficient, at any value of difference in oxygen concentration which may have to be measures, to avoid any penetration of the gas to be measured into the measuring system filled by the comparison gas. This makes it possible to arrange for the comparison gas issuing from the air gap to flow off very rapidly by natural convection and diffusion into the outer space.

It has been found to be very advantageous to protect the measuring system from external pressure effects, since the outflow orifices for the comparison gas open into the external space. According to a further feature of the invention, this is achieved by arranging for the discharge of the comparison gas, which is effected in the practically field-free space, to take place by way of two arcuate or annular gaps disposed symmetrically around the gap of the magnet. In this way, the outer pressure differences acting between the gaps cancel one another out in their effect on the measuring system.

Further enhancement of this reduction in the effect produced by external disturbances, can be achieved by arranging for the magnet gap and the annular gap to be protected by a common cap, the gas-permeability of which is so calculated that the comparison gas issuing from the magnet gap passes sufficiently rapidly to the exterior by convection and diffusion.

Use as a portable apparatus, in particular as a portable apparatus to give warning of lack of oxygen below ground requires the carrying along of a sufficiently large supply of comparison gas. According to a further development of the invention, the comparison gas may be stored in a supply container in the form of a corrugated tube providing metallic bellows. The gas supply is stored in such container under pressure and the container contracts during delivery of comparison gas, thus providing at all times an indication of the amount of gas still available.

Of particular value is the possibility of providing apparatus according to the invention in combination with known compressed-air breathing equipment. In this case, according to another feature of the invention, the compressed air supply of the breathing equipment may serve at the same time as the comparison gas.

The invention will be described more fully with reference to the accompanying drawings which illustrate, diagrammetically and by way of example only, two preferred constructional forms of the invention. In the drawings:

FIG. 1 is a sectional view of one such constructional form of measuring arrangement according to the invention;

FIG. 2 shows a detail of FIG. 1, drawn to a larger scale for the purpose of making the arrangement of the magnet clear;

FIG. 3 shows diagrammatically the construction of a second constructional form of the invention, which is especially suitable for measuring the oxygen content of the atmosphere, FIG. 4 is a fragmentary sectional view taken along line 4—4 of FIG. 3.

Figure 5:
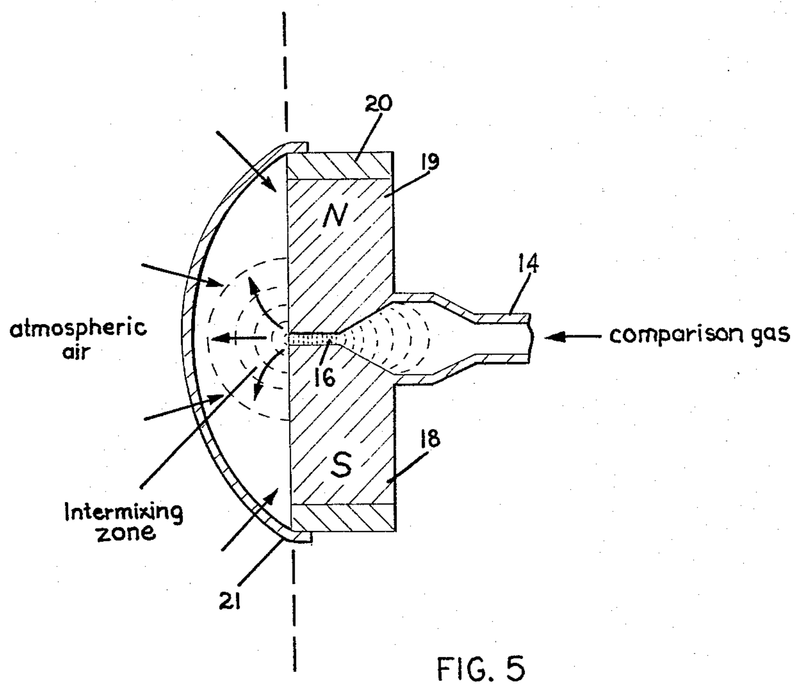
FIG. 5 is a sectional view taken along line 5—5 of FIG. 3.

Referring to FIGS. 1 and 2, in the first constructional form of the invention a pump 1 draws gas to be measured by way of a chamber 2 and also draws a comparison gas by way of a chamber 3, both gases being drawn by way of a section opening 4 arranged in the center of the air gap of the magnet. In parallel with the chambers 2 and 3 there is arranged a tube 5 having disposed therein, thermal flow-measuring means 6 which comprises, for example, a spiral of fine platinum or nicket wire freely suspended in the tube 5. In parallel with the measuring tube 5 there is arranged a closed circuit 7 having disposed therein flow-measuring means 8 similar to the means 6. Communication between the tube 5 and the circuit 7 is established by means of capillaries 9, the bore of which is so chosen that, while a constant renewal of the gas content of the circuit 7 takes place, their flow resistance is nevertheless so high that the flow measured in the tube 5 has practically no effect on the flow-measuring means 8. The two flow-measuring means 6 and 8 have central tappings and are connected, together with the battery 10 and a measuring instrument 11, to form a bridge circuit.

If the gases in the chambers 2 and 3 have different oxygen contents, a differential pressure occurs between the two chambers proportional to the difference in the oxygen contents. This gives rise to a flow through the tube 5 which is connected in parallel with the chambers 2 and 3. This flow disturbs the temperature equilibrium of the two halves of the measuring spiral 6 and thus gives rise to a change in the equilibrium of the bridge circuit appropriate to the flow velocity, which change is indicated by the instrument 11. Disturbances such as arise from flow effects generated by, for instance, thermal lift at the spirals or by acceleration in the case of movement of portable types of apparatus, act on both the flow-measuring means 6 and 8 in the same sense and therefore do not lead to any change in the equilibrium of the bridge. This requires that the flow resistance of the auxiliary circuit 7 should be equal to that of the measuring circuit connected to the tube 5. For this purpose the flow resistance of the circuit 7 can be varied by adjusting the screw 12.

Referring now to FIGURES 3 and 4, in the apparatus shown therein, the comparison gas consisting of, for example, air with a normal oxygen content of 21%, flows by way of the capillary **13*a* and the duct 14 through the air gap 16 of the magnet, consisting of pole pieces 18 and 19 and an annular member 20, into the external space. In parallel with this flow, a flow is also established by way of the capillary 13*b*, the duct 15 and the arcuate gaps 17 which are arranged concentrically around the air gap 16 of the magnet, in parallel relatively thereto. The rates of flow can be adjusted by means of the capillaries 13*a* and 13*b* and these rates, and also the flow resistances of the ducts and outlet passages, are so determined that, in the event of equality of oxygen concentration occurring as between the gas to be measured and the comparison gas, no flow occurs by way of the tube 5. Only when the outer atmosphere has an oxygen content differing from the normal content of the comparison gas does a magnetic pressure occur giving rise to a transverse flow in the tube 5, which flow is measured by the flow-measuring means 6** in the manner described above in detail.

FIG. 4 shows a gas-permeable protective cap 21 fitted over the annular member 20 of the magnet.

Tests with the arrangement shown in FIGURES 3 and 4 described in detail above have shown that, with a magnetic force of only a few hundred grams and an electric power for supplying the bridge of only 0.4 watt, differences from the normal oxygen content of the order of magnitude of 1/10% are reliably indicated. The consumption of comparison gas is about 1 liter/hour. Such a supply, together with the low weight of the magnet, renders possible the construction of a portable apparatus which can be operated over sufficiently long periods of time for it to be applicable in practice.

At the same time, the power delivered by the measuring bridge is sufficient, if necessary with amplifications by means of a small transistor chopper amplifier, to operate an optical or acoustic alarm by means of a small moving-coil relay if the oxygen content falls below the level required for breathing.

If the apparatus according to the invention is used in conjunction with the known compressed-air breathing equipment, such a warning device proves to be extremely useful when passing through areas rendered dangerous by lack of oxygen, because it makes economical use of the breathing equipment possible, the supply of air which is available from this source generally being very limited.

Of course, the invention is not limited to the indication of lack of oxygen, but it can be applied with advantage in any case in which either the difference in the oxygen content of two gases is to be measured or a comparison gas with a given oxygen content is available. Since, as is made clear above, only the comparison gas flows through the measuring system proper, there is obtained, in comparison with known thermomagnetic measuring methods, the particular advantage that the result of the measurement is independent of the non-magnetic properties of the gas mixture to be measured, that is to say, the result is independent of, for instance, the heat conductivity thereof prevailing at any given time, the specific heat thereof and the viscosity.

I claim:

1. Portable measuring apparatus for determining or comparing the oxygen content of gases, comprising: a gas chamber; means to establish a non-homogeneous magnetic field in said chamber; means for feeding to said chamber a gas whose oxygen content is to be determined; means for feeding a comparison gas to said chamber; a main gas flow system communicating with said chamber adapted for the flow of gas therein in response to pressure difference occurring between said first-mentioned gas and said reference gas under the influence of said magnetic field; a secondary gas flow system arranged in parallel with the said main system; a symmetrical bridge circuit including first thermal flow-measuring means in said main gas flow system and second thermal flow-measuring means in said secondary system; and adjusting means for adjusting the flow resistance of said secondary gas flow system, said bridge circuit being effective to indicate difference in oxygen content between said first-mentioned gas and said comparison gas giving rise to gas flow in said main gas flow system.

2. Apparatus according to claim 1, including means providing a duct opening into said chamber at the center of the homogeneous field of said magnetic field establishing means and means for drawing said gases from said chamber through said duct, said chamber having inlets for said gases located outside the field, and said main gas flow system extending between said inlet in parallel with said chamber.

3. Apparatus according to claim 2, wherein said magnetic field establishing means comprises a magnet having pole pieces arranged to define an air gap between them in said chamber, the inlet for feeding the comparison gas to said chamber being arranged to deliver the comparison gas to said air gap.

4. Apparatus according to claim 2, wherein said magnetic field establishing means comprises a magnet having pole pieces arranged to define an air gap between them in said chamber, the inlet for feeding the comparison gas to said chamber being arranged to deliver the comparison gas said air gap, and said pole pieces being constructed so that the air gap is of such a shape that the non-homogeneous field extends substantially wholly in said chamber, through the gas mixture therein.

5. Apparatus according to claim 2, wherein said magnetic field establishing means comprises a magnet having pole pieces arranged to define an air gap between them in said chamber, the inlet for feeding the comparison gas to said chamber being arranged to deliver the comparison gas to said air gap and a second means for feeding said comparison gas to a zone adjacent said air gap where the magnetic field of said magnet is substantially zero.

6. Apparatus according to claim 5 wherein said second means comprises slot means extending symmetrically relative to the air gap, for delivering said comparison gas.

7. Apparatus according to claim 6 wherein a gas permeable member covers said zone.

References Cited by the Examiner

UNITED STATES PATENTS

| | | | |
|---|---|---|---|
| 1,027,823 | 5/1912 | Davis | 73—23 |
| 2,696,731 | 12/1954 | Luft | 73—23 |
| 2,729,097 | 1/1956 | Cherrier | 324—36 X |

RICHARD C. QUEISSER, *Primary Examiner.*

J. FISHER, *Assistant Examiner.*